US011757845B2

(12) United States Patent
Flavel et al.

(10) Patent No.: US 11,757,845 B2
(45) Date of Patent: Sep. 12, 2023

(54) PRIVATE COMMUNICATION SERVICE IN A PUBLIC CLOUD ENVIRONMENT

(71) Applicant: salesforce.com, inc., San Francisco, CA (US)

(72) Inventors: Ashley Ryan Flavel, Seattle, WA (US); William Lui, Alameda, CA (US); David Lucey, Arlington, WA (US)

(73) Assignee: Salesforce, Inc., San Francisco, CA (US)

( * ) Notice: Subject to any disclaimer, the term of this patent is extended or adjusted under 35 U.S.C. 154(b) by 482 days.

(21) Appl. No.: 17/085,169

(22) Filed: Oct. 30, 2020

(65) Prior Publication Data

US 2022/0141195 A1    May 5, 2022

(51) Int. Cl.
*H04L 29/06* (2006.01)
*H04L 9/40* (2022.01)
*H04L 43/08* (2022.01)
*H04L 43/12* (2022.01)

(52) U.S. Cl.
CPC .............. *H04L 63/04* (2013.01); *H04L 43/08* (2013.01); *H04L 43/12* (2013.01); *H04L 63/10* (2013.01)

(58) Field of Classification Search
CPC ......... H04L 63/04; H04L 43/08; H04L 43/12; H04L 63/10; H04L 63/107; H04L 63/1425; H04L 43/0852; H04L 43/10; H04L 67/10; H04L 41/5058
USPC ............................................................ 726/4
See application file for complete search history.

(56) References Cited

U.S. PATENT DOCUMENTS

| | | | |
|---|---|---|---|
| 2015/0007263 A1* | 1/2015 | Stewart ............... | H04L 63/0815 726/3 |
| 2019/0102162 A1* | 4/2019 | Pitre ..................... | H04L 63/104 |
| 2021/0409486 A1* | 12/2021 | Martinez ............. | H04L 67/1001 |

* cited by examiner

*Primary Examiner* — Tu T Nguyen
(74) *Attorney, Agent, or Firm* — Fenwick & West LLP (57) ABSTRACT

A private communication set-up service enables scalable private connectivity between producers and consumers residing within a public cloud environment. A producer exposes metadata information about a new or updated resource within the public cloud environment using a tag. The system monitors the public cloud environment for tagged metadata about new resources and configures a producer-side service to a private link. Subsequently, the system exposes metadata information about the private link. The system monitors for tagged metadata about private links and configures the consumer-side private link endpoint to the private link. The producer and the consumer communicate using the configured private link.

20 Claims, 6 Drawing Sheets

PRIVATE COMMUNICATION SERVICE IN A PUBLIC CLOUD ENVIRONMENT

BACKGROUND

Field of Art

This disclosure relates in general to communication within a public cloud environment, and in particular to setting up scalable secure private communication links using a trusted public cloud architecture.

Description of the Related Art

Cloud computing platforms has become increasingly popular in providing software, platform, and infrastructure services. For instance, public cloud service providers may provide on-demand network access to compute resources, database storage, content delivery, and other services that may be used by entities. As more and more entities migrate to a public cloud environment, security, scalability, and reliability issues begin to arise.

Entities using public cloud services may communicate using public IP addresses. These entities may be susceptible to the security dangers of exposing their gateways to the Internet. For example, they may be susceptible to DDos (distributed denial of service) attacks. Public cloud providers may offer private communication pathways by hosting virtual private clouds (VPC) to avoid Internet exposure. However, protocols used by the public cloud providers may provide limited scalability and reliability.

Accordingly, conventional techniques for communicating while using the services offered by public cloud providers may have limited security, scalability and reliability.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral.

DETAILED DESCRIPTION

More and more entities, such as enterprises, are migrating to public cloud environments. Customers of a public cloud environment (PCE) may be producers offering a variety of services, as well as consumers of these services. A producer represents one or more processes executing on computing systems that provide services for invocation and use by other computing systems. A consumer represents the one or more computing systems that invoke a service provided by a producer. As the number of customers of a public cloud environment grow, significant issues of security, scalability, and reliability arise. For example, customers using public cloud services may communicate using public IP addresses. Consider entity A and entity B that are residing in PCE-A and PCE-B, respectively. Typically, irrespective of whether PCE-A and PCE-B are the same public cloud environment or different public cloud environments, when A wishes to communicate with B, communications from A undergo network address translation within the PCE-A to an egress gateway with a public IP address, get routed through the Internet, enter PCE-B through an ingress gateway with another public IP address, and undergo network address translation once again to reach B. Using network address translation at both endpoints in a communication link may add latency that may be critical to some applications. The entry to PCE-B may be secured by network-level access controls that are put in place by the provider of PCE-B. While public cloud providers offer such access control to provide security, entities using public IP addresses may still be susceptible to the security dangers of exposing their gateways to the Internet. For example, they may be susceptible to volumetric attacks such as distributed denial-of-service (DDoS) attacks. Furthermore, the access controls offered by public cloud environments may not scale. For example, public cloud providers may limit the network access control lists (ACL) to 1000 lines per hosted virtual private cloud within a public cloud environment. As entities continue to grow, these ACL limits as well as the latency burdens may significantly impact the expansion.

Public cloud providers offer the ability for customers to communicate using private communication links. Leveraging such private communication links provided by the public cloud providers limits Internet exposure and allows the use of aliases in addressing at the endpoints of the private communication link; however, the protocols that are put in place by the public cloud providers may provide limited scalability and reliability.

A particular challenge in using private communication services, such as those offered by current public cloud providers, include use of a three-way handshake to establish a private link between two customers that wish to communicate privately. For example, a producer creates a private link service to provide access to services that are offered. Each consumer requiring access to these services has to explicitly request the access to the private link service created by the producer. Subsequently, the producer has to approve the private link service access request. With expected scale of thousands of services and tens of thousands of consumers requiring access to these services, such a three-way handshake protocol sets up a significant operational challenge in terms of scalability.

Embodiments of the private communication set-up system described herein resolve these issues Embodiments relate to setting up a private communication link to a service offered by a producer in a public cloud environment. The embodiments described herein ensure that access to reach a service is provided only when a consumer resides within producer-defined scope. The public cloud environment is monitored for one or more metadata tags associated with a corresponding one or more services offered by one or more producers. In response to the monitoring, metadata is extracted from an identified first metadata tag associated with a service offered by a producer. A producer-side private link service is configured to a private communication link for accessing the service based on the extracted metadata, where the producer-side private link service is located within a logical boundary surrounding the producer in the public cloud environment. A second metadata tag that is associated with the private communication link is exposed in the public cloud environment, this tag enabling a requesting consumer to request for and obtain access the service offered by the producer through the private communication link.

Furthermore, in embodiments described herein, the public cloud environment is monitored for at least one of: a new metadata tag, and a metadata tag with updated field values. Extracting the metadata involves extracting field values from the identified first metadata tag, the field values being one or more of: a name of the service, a scope of exposure of the service; and parameters of an active probe test for the service. Furthermore, configuring the producer-side private link service to the private communication link for accessing the service based on the extracted metadata involves creating a private domain name server (DNS) record based on the name of the service, and configuring a private DNS based on created record so that using the name of the service will reference one of: the producer, and a network load balancer that is attached to the producer. Exposing the second metadata tag associated with the private communication link involves creating a tag with metadata information comprising one or more of: name of the service, scope of exposure of the service, and parameters of an active probe test for the service, and displaying the tag in the public cloud environment.

Embodiments described herein also relate to setting up a private communication link to access a service by a consumer in a public cloud environment. The public cloud environment is monitored for one or more metadata tags associated with a corresponding one or more private communication links to services offered by one or more producers. Responsive to the monitoring, metadata is extracted from an identified metadata tag associated with a private communication link to a service offered by a producer. A consumer-side private link endpoint is configured to the private communication link based on the extracted metadata, where the consumer-side private link endpoint is located within a logical boundary surrounding the consumer in the public cloud environment. The consumer-side private link endpoint enables the consumer to request and obtain access to the service offered by the producer through the private communication link.

Furthermore, in embodiments described herein, the public cloud environment is monitored for at least one of: a new metadata tag, and a metadata tag with updated field values. Extracting the metadata involves extracting field values from the identified first metadata tag, the field values being one or more of: a name of the service, a scope of exposure of the service; and parameters of an active probe test for the service. Furthermore, configuring the consumer-side private link end-point to the private communication link for accessing the service based on the extracted metadata involves creating a private domain name server (DNS) record based on the name of the service, configuring a private DNS based on created record so that using the name of the service will reference the consumer-side private link endpoint to the private communication link, and configuring an active probe test based on the extracted parameters. The configured active probe obtains telemetry data comprising one or more of: jitter, success and failure rate in consumer-side private link endpoint creation, and latency statistics.

Overall System Environment

Figure 1:
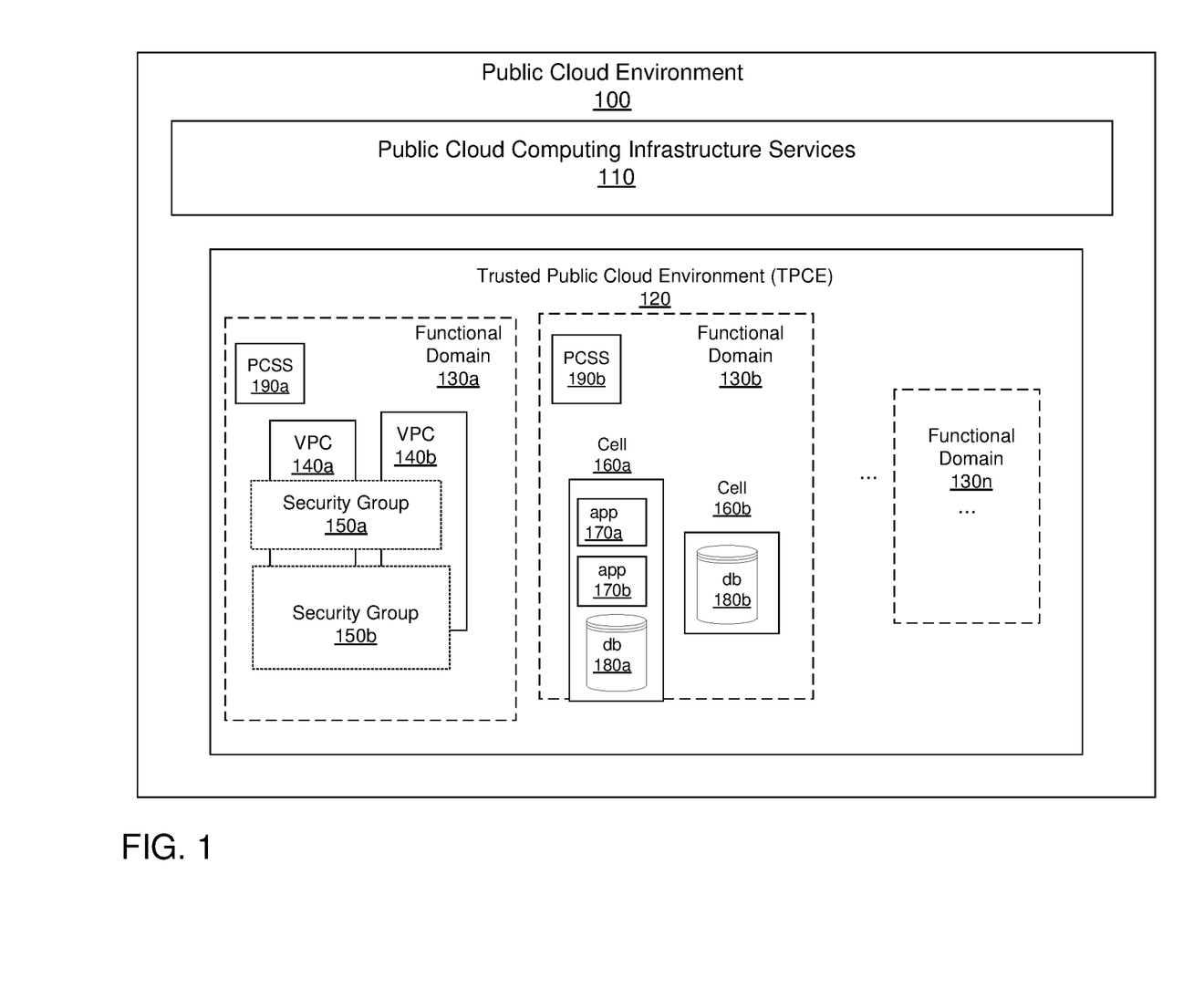
FIG. 1 depicts a block diagram illustrating functional blocks for a trusted public cloud environment that leverages a widely available public cloud environment, according to one embodiment.

FIG. 1 shows a block diagram illustrating a trusted public cloud environment (TPCE) 120 that leverages an available public cloud environment (PCE) 100, in accordance with one embodiment. Public cloud environments 100 are owned and operated by third-party providers, and the hardware, software, and supporting infrastructure is also owned and managed by the third-party cloud provider. Examples of public cloud environment 100 include, for example, Amazon Web Services™ (AWS™), Google Cloud Platform™ (GCP™), Azure™, etc.

A public cloud environment 100 offers a range of public cloud computing infrastructure services 110 that may be used on demand by a trusted public cloud environment 120. Examples of the public cloud computing infrastructure services include servers, storage, databases, networking, security, load balancing, software, analytics, intelligence, and other infrastructure service functionalities. These infrastructure services may be used by the trusted public cloud environment 120 to build, deploy, and manage applications in a scalable and secure manner. The trusted public cloud environment 120 is a trusted public cloud architecture with processing resources, networking resources, storage resources, and other service functionalities with security boundaries that are strictly enforced. An example of a trusted public cloud environment 120 is a datacenter with defined and strictly enforced security boundaries.

The trusted public cloud environment 120 has specific attributes, in accordance with some embodiments. These attributes include attributes required to use available public cloud infrastructure services 110, for example region-specific attributes or environment type specific attributes. Further attributes support security needs, availability expectations, architectural agility coupled with reliability, developer agility, distributed capabilities, and the ability to perform on multiple available public cloud environments.

The trusted public cloud environment 120 may support multiple functional domains 130*a*, 130*b*, . . . , 130*n*. Each functional domain (FD) 130 represents a set of capabilities and features and services offered by one or more computing systems that can be built and delivered independently, in accordance with one embodiment. A functional domain 130 may also be viewed a set of cohesive technical use-case functionalities offered by one or more computing systems. A functional domain 130 has strictly enforced security boundaries. A functional domain 130 defines a scope for modifications. Thus, any modifications to an entity—such as a capability, feature, or service—offered by one or more computing systems within a functional domain 130 may propagate as needed or suitable to entities within the functional domain, but will not propagate to an entity residing outside the bounded definition of the functional domain 130.

Each functional domain 130 may contain multiple virtual private cloud (VPC) networks, 140a, 140b, ..., etc. Each virtual private cloud 140 is an on-demand pool of shared resources that are allocated within the functional domain 130 and provide a level of isolation between the users using the resources. Each functional domain 130 may also contain multiple security groups, 150a, 150b, ..., etc. Each security group 150 represents a declarative model for enforcing network segmentation. Each security group 150 includes entities with similar risk service profiles collected into a single security group with explicit declarative policy brokering connectivity between the groups.

A functional domain 130 may also contain one or more cells, 160, 160b, ..., etc. A cell 160 represents a collection of services that scale together, and that may be sharded. These services may be applications 170a, 170b, ..., etc., and/or databases 180a, 180b, ..., etc.

In embodiments described herein, a functional domain 130 may also contain an instance of a private communication set-up system (PCSS) 190a, 190b, ..., that represents one or more computing systems executing a time- or event-driven process within the functional domain. In some embodiments, each instance of a private communication set-up system 190 has producer-specific functionality as well as consumer-specific functionality. The private communication set-up system 190 sets up private communication links for consumers within one functional domain to access services offered by producers that are executing within the same or a different functional domain from the consumer.

Private Communication Set-Up Service

Figure 2:
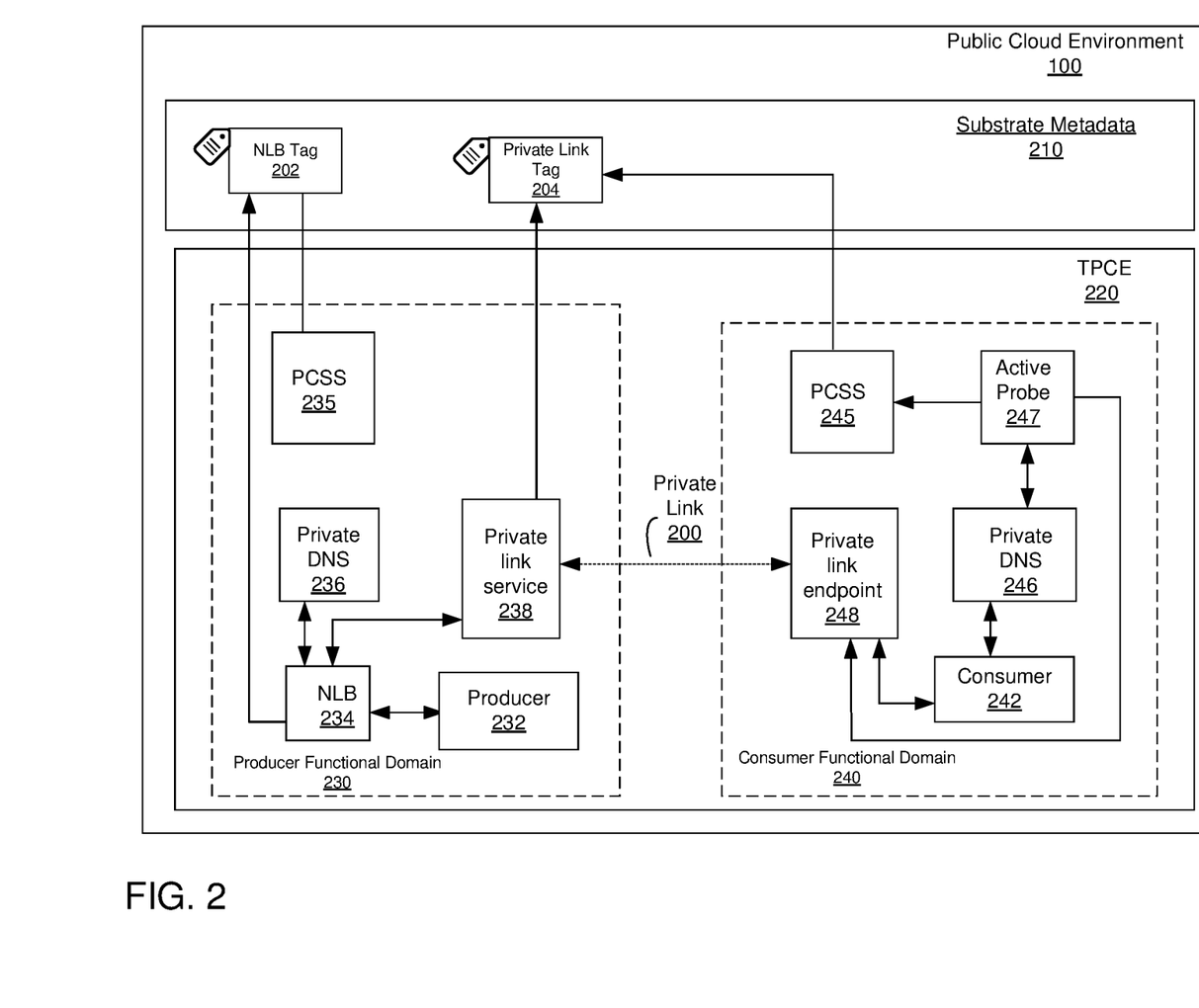
FIG. 2 shows a system configuration illustrating private communication between a producer and a consumer in a trusted public cloud environment, according to one embodiment.

FIG. 2 depicts a use-case example of a private communication set-up system, such as private communication set-up system 190 depicted in FIG. 1, in accordance with one embodiment. The example shown in FIG. 2 may be performed in a trusted public cloud environment such as trusted public cloud environment 120 that resides within a public cloud environment such as public cloud environment 100 depicted in FIG. 1. FIG. 2 depicts operational functionalities of an instance private communication set-up system 235 of the system private communication set-up system 190 that is executing in the functional domain 230 of a producer 232 and an instance private communication set-up system 245 of the system private communication set-up system 190 that is executing in the functional domain 240 of a consumer 242.

A public cloud environment 100 offers substrate infrastructure services 110 as depicted in FIG. 1. The public cloud infrastructure services 110 include processing resources, networking resources, storage resources, and other service functionalities. Metadata associated with substrate services may be exposed in substrate metadata 210. Examples of substrate metadata 210 include tags or labels that may be attached to resources/services created by customers of the public cloud environment. For example, AWS™ allows customers to attach a tag to their AWS™ resources. A tag may include one or more customer-defined keys/fields with one or more optional values for managing, searching for, and filtering resources. These tags and the associated metadata in the key/field values may be displayed in the public cloud environment.

A functional domain with a producer offering a service, i.e., producer functional domain 230, contains a producer 232 that creates a service for use by a consumer. In accordance with some public cloud environment requirements, producer 232 may attach a network load balancer (NLB) 234 so that all communication directed towards producer 232 for the created service from either within the producer functional domain 2330 or from outside the producer functional domain 230 is directed via the NLB 234. In other public cloud environment environments, it may be possible to directly address producer 232 without being directed via an NLB 234. While the following description is based on a public cloud environment requiring a producer to be attached to an NLB, in embodiments where a public cloud environment does not require an NLB to be attached to a producer, the service may replace all actions performed with respect to an NLB attached to a producer with actions performed directly with respect to the producer.

In accordance with some embodiments, while offering a service, producer 232 creates a certificate with a well-structured name. For example, a well-structured name attached to the certificate may be of the form: <service>.<namespace>.<producer FD><producer TPCE>.spcnme.net The use of a well-structured name and certificates enforces trusted and secure connectivity between the producer 232 and a consumer 242. The producer 232 also tags the offered service, i.e., NLB 234, with metadata information associated with the offered service. The metadata information may include the name and the scope of exposure being offered by the producer 232 regarding the service. For example, the scope may specify exposure to all functional domains within the trusted public cloud environment such as trusted public cloud environment 120 in FIG. 1, or may specify exposure to all functional domains within a region of type device/test/perf, etc. The metadata information may also include parameters of an active probe test for configuring an active probe for monitoring the service being offered to consumers who are accessing the service from the producer. The metadata information is exposed by producer 232 as NLB tag 202 in the substrate metadata 210. Subsequently, producer 232 may inform consumers to use the offered service by using a well-structured name, for example: <service>.<namespace>.<producer FD> <producer TPCE>.spcnme.net to connect to the offered service.

For example, producer 232 may tag NLB resource 234 with a private communication link tag ("PrivateCommunicationLink" tag) NLB tag 202. The tagging may be performed by producers 232 dynamically at runtime, or in in the course of delivering infrastructure as code to build, provision, deploy and manage the trusted public cloud environment 220. In some embodiments, the tag may be represented as a j son blob (max size 255 chars). In some embodiments, the tag may have extra characters and may comprise multiple tags or link to object storage provided by the public cloud environment (e.g., AWS™ storage in the form of an S3 blob). An example of a private communication link tag developed for the Azure™ public cloud environment is depicted below. The metadata information is entered in the depicted field values:

---

PrivateCommunicationLink tag

{
  "servicename": "Vault", #name of service
  "scope": "TPCE", #scope that producer wants for service
  "DNS": "vault.vault.vaultFD.dev-aws-uswest2.spcnme.net",
DNS name
  "Healthcheck": "/keepalive", #endpoint that will be subjected
to active probe to monitor performance
  "Azure": #any PCE specific private link configurations
required
  {
    "NATIPs": "2",
  }
}

---

The above example includes public cloud environment specific parameter values such as "Azure" and related parameter values for the Azure™ environment, such as a "NATIPs" value that may specify the number of IP addresses from which a server may receive requests. Embodiments described herein provide capabilities that may be applied to various public cloud environments, for example, Amazon Web Services™ (AWS™), Google Cloud Platform™ (GCP™) Azure™, etc.

According to some embodiments, an instance private communication set-up system 235 of the private communication set-up system that is executing in producer functional domain 230 may monitor all NLB resources for a new or updated private communication link tag (e.g., "PrivateCommunicationLink" tag shown above). In some embodiments, private communication set-up system 235 may be configured to perform the monitoring periodically at a prespecified frequency. In some embodiments, private communication set-up system 235 may be configured to receive notifications when a new or updated NLB tag is created. An updated NLB tag is one where one or more field values of the tag have changed. The private communication set-up system 235 extracts the metadata (i.e., the field values) from new or updated NLB tag 202 and configures a producer-side private link service 238 to a private link 200 that is offered by the public cloud environment. The configured producer-side private link service 238 is based on the extracted metadata. The private communication set-up system 235 attaches the newly configured producer-side private link service 238 to NLB 234. The private communication set-up system 235 then creates a private link tag 204 with metadata information. The private link tag 204 is attached to the private communication link with the configured producer-side private link service 238 and is exposed as private link tag 204 in the substrate metadata 210. The metadata information provided in the private link tag 204 is used to configure a consumer-side private link endpoint on a consumer functional domain, such as consumer functional domain 240. An example private link tag 204 (e.g., "PrivateLink" tag) is depicted below with metadata information in the following field values:

---
PrivateLink tag
---
{
  "servicename": "Vault"
  "scope": "TPCE"
  "DNS": "vault.vault.vaultFD.dev-aws-uswest2.abcdef.net"
  "Healthcheck": "/keepalive
}
---

The private communication set-up system 235 requires a certificate on the service side. As previously noted, this certificate is created by the producer 232 when offering the service. The name specified on the certificate, for example, "spcnme.net" is used by every consumer requiring access to the services. The private communication set-up system 235 configures a Private DNS 236 based on the prespecified well-structured name. The private communication set-up system 235 creates a private DNS record in Private DNS 236 so that all access to NLB 234 within producer functional domain 230 is through the created producer-side private link service 238. Thus, any consumer that may reside within the producer functional domain 230 communicates with NLB 234 using the well-structured specified name and through the configured producer-side private link service 238. For a consumer that resides in a consumer functional domain 240 that is not the same as the producer functional domain 230, the communication with producer 232 via NLB 234 is described in the following paragraphs.

In some embodiments, an instance private communication set-up system 245 of the private communication set-up system executes in consumer functional domain 240 within which a consumer 242 is located. The private communication set-up system 245 monitors the substrate metadata for a new or updated private link tag (e.g., "PrivateLink" tag shown above). In some embodiments, private communication set-up system 245 may be configured to perform the monitoring periodically at a prespecified frequency. In some embodiments, private communication set-up system 245 may be configured to receive notifications when a new or updated private link tag 204 is created. An updated private link tag 204 is one where one or more field values of the tag have changed. The private communication set-up system 245 extracts the metadata (i.e., the field values) from the new or updated private link tag 204. The PCS 245 configures a consumer-side private link endpoint 248 at the consumer functional domain end of the private link 200 offered by the public cloud environment based on the extracted metadata from the private link tag 204.

The private communication set-up system 245 configures a Private DNS 246 based on the prespecified name extracted from the metadata in the private link tag 204. The private communication set-up system 245 creates a private DNS record in Private DNS 246 so that all access to NLB 234 within the producer functional domain 230 is through the created consumer-side private link endpoint 248 in consumer functional domain 240. The private communication set-up system 245 attaches the consumer-side private link endpoint 248 to the consumer 242. Thus, any consumer that may reside within the consumer functional domain 240 may communicate with NLB 234 using this specified name, and through the configured consumer-side private link endpoint 248. The private communication set-up system 235 may specify the consumer-side private link endpoints 248 of specific consumers 242 as permitted to establish connections or may auto-approve any connections established from the consumer side. In some embodiments, the private communication set-up system 235 may specify environment-specific consumers and producer services, such as, for example, consumers residing within a particular specified "dev" environment may establish connections with the producer services in the "dev" environment.

The private communication set-up system 245 configures an active probe 247 based on the parameters extracted from the private link tag 204. Active probe 247 obtains telemetry data regarding jitter, successes and failures in the consumer-side private link endpoint creation, latency statistics, etc. Active probe 247 sends the obtained telemetry data to the private communication set-up system 245. The private communication set-up system 245 may store the logged telemetry data in a local data store and periodically send the telemetry data as needed for further network infrastructure management within the consumer functional domain 240, or elsewhere. In some embodiments, the private communication set-up system 245 may send the telemetry data periodically at a configurable frequency or at a default frequency.

Each time a new consumer seeks access to the services offered by the producer 232, the private communication set-up system instance that is running in the corresponding consumer functional domain automatically does the following: create a consumer-side private link endpoint based on prior monitoring for private link tags 204 by the consumer component of the private communication set-up system instance running within the corresponding consumer functional domain; configure the Private DNS in the consumer functional domain with the DNS record so that all access to NLB 234 within the producer functional domain 230 for the new consumer is through the created consumer-side private link endpoint, thereby attaching the consumer to the created consumer-side private link endpoint. Thus, each time a new producer offers services, the private communication set-up system on the producer functional domain operates once to set up the producer-side private link service 238 as described above. For each new consumer require access to the services offered by the producer, a private communication set-up system instance executing in the functional domain of the consumer establishes the consumer-side private link endpoint on the consumer functional domain for communicating with the producer-side private link service that has been set up in the functional domain of the producer. Thus, embodiments of the private communication set-up system avoid the conventional three-way handshake protocol that is performed by a producer and every consumer each time they wish to communicate in conventional systems, and thereby resolve the scalability issues of the conventional three-way handshake protocol. Furthermore, the coordinated secure communication between producers and consumers is automated.

System Architecture

Figure 3:
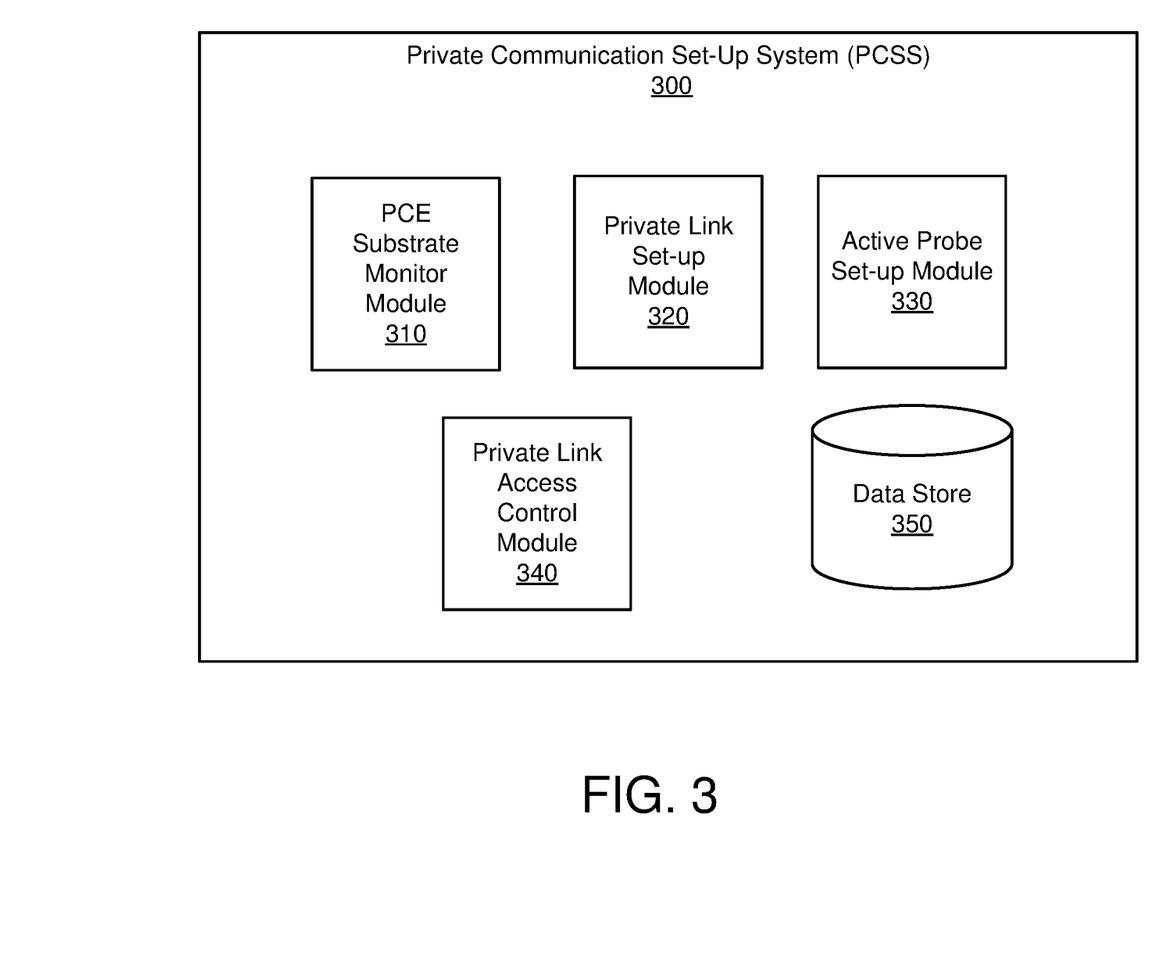
FIG. 3 is a block diagram illustrating components of a private communication set-up system in a trusted public cloud environment, according to one embodiment.

FIG. 3 is a block diagram illustrating modules of the private communication set-up system 300 according to one embodiment. The private communication set-up system 300 includes a public cloud environment substrate monitor module 310, a private link set-up module 320, a private active probe set-up module 330, a private link access control module 340, and a data store 350. Alternative configurations of private communication set-up system 300 may include different and/or additional modules. Functionality that is indicated as being performed by a particular module may be performed by other modules than those indicated herein. Furthermore, steps of any processes described herein can be performed in an order different from that illustrated herein.

The modules of private communication set-up system 300 may execute in a trusted public cloud environment such as a trusted public cloud environment 120 that resides within a public cloud environment such as public cloud environment 100 depicted in FIG. 1. The private communication set-up system 300 may be used to perform the operational functionalities described in FIG. 2 as being performed by private communication set-up system 235 and private communication set-up system 245. Each instance of the private communication set-up system 300 may operate within a functional domain to set up the private communication endpoints needed for communication between producers and/consumers in the functional domain.

The public cloud environment substrate monitor module 310 monitors the substrate of a public cloud infrastructure services for new or updated tagged metadata that are exposed as part of substrate metadata. New or updated tagged metadata may expose information regarding a new or updated service offered by a producer. In some embodiments, such new or updated metadata may be posted by a producer residing in the functional domain in which private communication set-up system 300 is executing. Module 310 executes in an instance of the private communication set-up system 300 in the producer functional domain and monitors for such exposed metadata.

New or updated metadata may also expose metadata information regarding a producer-side private link endpoint that has been configured within the functional domain of the producer to obtain access to the service offered by the producer. The public cloud environment substrate monitor module 310 also executes in an instance of the private communication set-up system 300 executing in the consumer functional domain and monitors for such exposed metadata. This monitoring is for the purpose of obtaining information for configuring a consumer-side private link endpoint to a private link in the consumer functional domain so that a consumer may reliably and securely obtain access to the producer's services.

Examples of substrate metadata that the public cloud environment substrate monitor module 310 monitors for include tags or labels that may be attached to services (such as services offered by producers) or created producer-side private link service configurations. In some embodiments, a service offered by a producer may be tagged with a private communication link tag "PrivateCommunicationLink" tag (e.g., NLB tag 202 in FIG. 2). In some embodiments, a private link endpoint may be tagged with a "PrivateLink" tag (e.g., NLB tag 204 in FIG. 2). A tag may consist of a one or more customer-defined keys or fields with one or more optional values for managing, searching for, and filtering the offered services. The metadata information exposed by the PrivateCommunicationLink tag and the PrivateLink tag include a name that is specified by the producer, and that is used by every consumer requiring access to the offered service. The metadata may include the scope of exposure being offered by the producer regarding the service. For example, the scope may specify exposure to all functional domains within the trusted public cloud environment such as trusted public cloud environment 120 in FIG. 1, or may specify exposure to all functional domains within a region of type device/test/perf, etc. The metadata information may also include parameters of an active probe test to be performed in a consumer functional domain for obtaining telemetry data regarding access to the service by a consumer.

Examples of a PrivateCommunicationLink tag and a PrivateLink tag are depicted in association with FIG. 2 above. These are example tags. Other examples may include different names, values, fields, and parameters. These examples illustrate how a tagging system that may be offered in a public cloud environment may be used to expose data for use in setting up private communication between customers in a public cloud environment.

In some embodiments, module 310 may monitor for a new or updated "Private CommunicationLink" tag or "PrivateLink" tag. In some embodiments, module 310 may be configured to perform the monitoring periodically at a prespecified frequency. In some embodiments, the module 310 may be configured to additionally or alternately receive notifications when a new or updated tag (i.e., PrivateCommunicationLink tag or PrivateLink tag) is exposed in the metadata. An updated tag may be described as a tag where one or more field values of the tag have changed. In some embodiments, the tag may consist of a json blob (max size 255 chars). In some embodiments, the tag may have extra characters and may comprise multiple tags or link to object storage provided by the public cloud environment. Upon identifying that there is a new or updated tag, module 310 extracts the metadata (i.e., the field values) from the identified new or updated tag. In some embodiments, module 310 may send the extracted metadata information to the private link set-up module 320. In some embodiments, the PCE substrate monitor module 310 may store the extracted metadata information at the data store 350.

The private link set-up module 320 configures a private communication link within the functional domain in which the module 320 is executing. The configured private link is based on the extracted metadata of the new or updated tag to a service that is offered by a producer within the functional domain in with module 320 is executing. Module 320 may retrieve the extracted metadata from the data store 350 or it may receive the extracted metadata from the PCE substrate monitor module 310. The metadata (e.g., the extracted metadata from a new or updated PrivateCommunicationLink tag that is extracted by module 310) is used to configure the producer-side private link service (i.e., in the producer functional domain). Module 320 uses the name (specified by the producer for the service) that is in the exposed metadata to create a private DNS record associated with the name. Module 320 configures a private DNS module in the producer functional domain based on the prespecified name in the extracted metadata. When configuring the producer-side private link service, module 320 creates a private link tag (e.g., the PrivateLink tag) that is attached to the newly created producer-side private link service in the producer functional domain and includes metadata information about this endpoint. Module 320 then exposes the private link tag in the substrate metadata.

If a producer wishes to remove a private link to a service they offer, this is done by explicitly changing a value of the scope in the PrivateCommunicationLink tag for the service exposed by the producer in the substrate. In some embodiments, the field value for the scope parameter may be changed (e.g., to "none" or "null"). Changing the scope parameter rather than just removing the tag exposure in the substrate reduces the possibility of inadvertently deleting an existing private link by accidentally deleting an exposed tag. The private link setup module 320 will propagate this modified value of the scope parameter to the exposed PrivateLink tag that is linked to the producer-side private link service. The modified value of the scope parameter will be subsequently extracted as part of the metadata by the instance of the private communication set-up system 300 that is executing in the functional domain of the consumer. This will ensure that the metadata information regarding a "deleted" private link will be propagated to all consumer functional domains. Furthermore, all changes to tag field values are logged and sent to the data store 350.

The private link set-up module 320 in private communication set-up system 300 that is executing in the functional domain of a consumer configures a consumer-side private link endpoint of the private link based on the extracted metadata from the private link tag. Module 320 may retrieve the extracted metadata from the data store 350 or it may receive the extracted metadata from the PCE substrate monitor module 310. The metadata (e.g., the extracted metadata from a new or updated PrivateLink tag that is extracted by the PCE substrate monitor module 310) is used to configure a corresponding consumer-side private link endpoint in the consumer functional domain. The newly configured consumer-side private link endpoint connects the consumer to the service offered by the producer through a private link between the producer and consumer functional domains. The private endpoint set-up module 320 uses the name (specified by the producer for the service) that is in the exposed metadata to create a private DNS record associated with the name. Module 320 configures a private DNS module in the functional domain of the consumer based on the prespecified name extracted from the extracted metadata.

The active probe set-up module 330 configures an active probe based on extracted metadata from the private link tag (e.g., the "Healthcheck" parameter values in the PrivateLink tag depicted with respect to FIG. 2) in the functional domain of a consumer. The module 330 may retrieve the parameters for configuring the active probe from stored metadata information in the data store 350 and configure the active probe based on the retrieved parameter values. The configured active probe determines telemetry data regarding successes and failures in the private endpoint creation, latency statistics, etc., and sends the telemetry data to the data store 350.

The private link access control module 340 controls access to the service offered by a producer based on consumer subscriptions to the producer service. The module 340 controls access by attaching a configured private link endpoint in a consumer's functional domain to a consumer based on valid consumer subscriptions that are whitelisted (permitted access) explicitly by a producer. For example, there may be multiple types of functional domains defined within the trusted public cloud environment, and the whitelisting may be able to specify permissions such as "allow all consumers from 'dev' and 'test' type functional domains" or "allow all consumers from 'prod' functional domain." The module 340 may be viewed as taking control of access to a producer's service and bypassing the network access control service to public IP addresses provided by public cloud providers (e.g., ACL list limits of 1000 lines per hosted virtual private cloud within a public cloud environment).

The data store 350 stores information for the private communication set-up system 300. The stored data may in association with configuring a private communication link for a consumer to access a service offered by a producer. The stored data includes metadata information extracted from tags such as a PrivateCommunicationLink tag or a PrivateLink tag exposed in substrate metadata. The stored metadata information may include the name and the scope of exposure being offered by a producer regarding an offered service. Furthermore, all changes made to tag field values (by the producer, etc.) are logged and stored in the data store 350. The stored metadata information may also include parameters of an active probe test subsequently used to configure an active probe for monitoring the service being offered to consumers accessing a service from a producer. The data store 350 may store telemetry data from a configured active probe executing in the functional domain of a consumer of a service. The logged telemetry data may be periodically retrieved from the data store 350 as needed for further network infrastructure management within the consumer functional domain.

The data store 350 is a memory, such as a read only memory (ROM), dynamic random-access memory (DRAM), static random-access memory (SRAM), or some combination thereof. In some embodiments, the various modules of the private communication set-up system 300 may pass various data values directly to each other. In some embodiments, the various modules of the private communication set-up system 300 may store data values in the data store 350 and retrieve data values as needed from the data store 340.

Producer End Process

Figure 4:
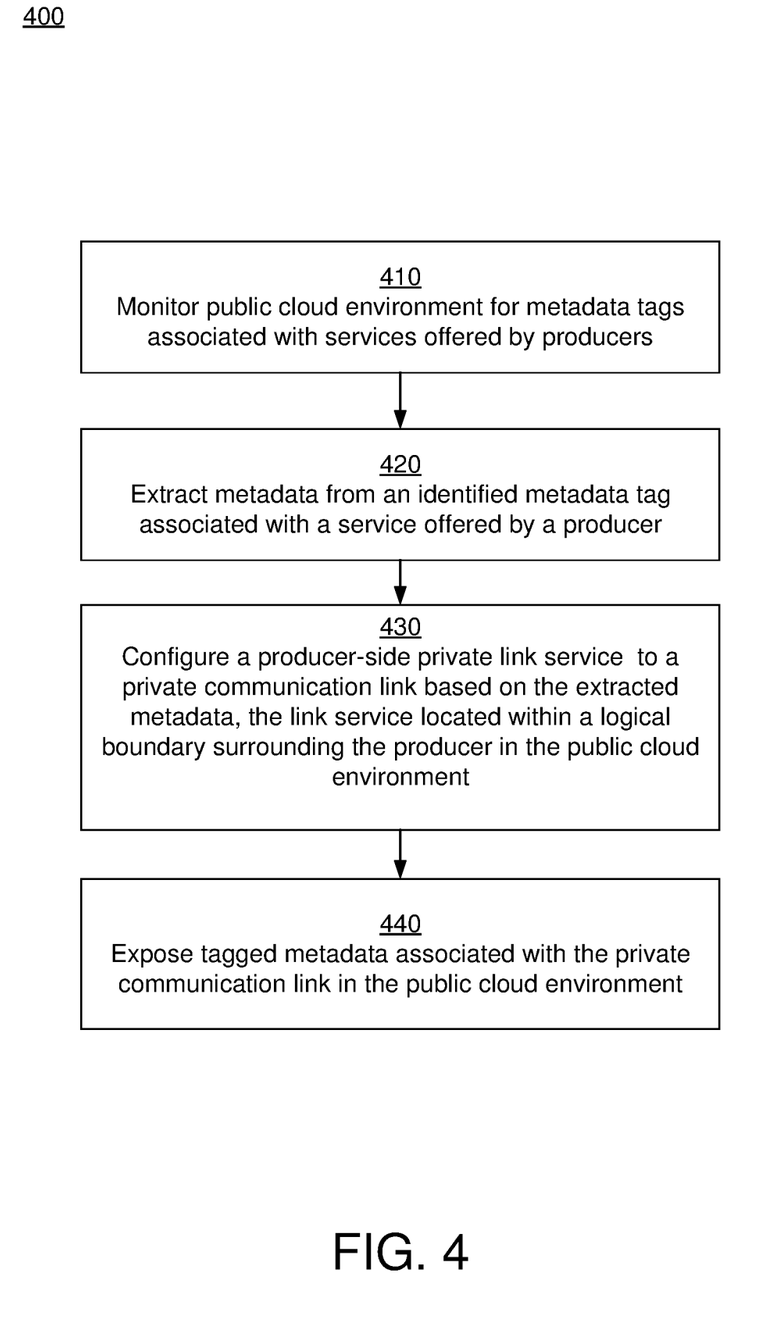
FIG. 4 is a flow chart illustrating the process for enabling private communication with respect to a producer in a trusted public cloud environment, according to one embodiment.

FIG. 4 is a flow chart illustrating the overall process for setting up a private communication link to a resource offered by a producer in a public cloud environment using a private communication set-up system 300 (shown in FIG. 3) according to one embodiment. The process illustrated herein is performed by an instance of the system 300 that is executing in a functional domain in which the producer offering the service is located. Various embodiments can perform the steps of FIG. 4 in different orders than those indicated herein. Moreover, other embodiments can include different and/or additional steps than the ones described herein.

The private communication set-up system 300 monitors 410 the substrate of a public cloud infrastructure services for one or more new or updated metadata tags that are associated with a corresponding one or more services offered by one or more producers. The new or updated metadata tags are exposed by producers offering services. A producer (and an attached network load balancer, if needed) is located in the functional domain within which the system 300 is executing. In some embodiments, the system 300 may monitor the substrate metadata periodically at a prespecified frequency for new or updated metadata tags regarding new or updated tags. In some embodiments, the system 300 may be configured to additionally or alternately receive notifications when a new or updated tag is exposed in the substrate.

The private communication set-up system 300 extracts 420 metadata information from an identified metadata tag that is associated with a service offered by a producer based on the monitoring. In some embodiments, the extracted metadata information includes a name that is specified by the producer, and that is used by every consumer requiring access to the offered service. The extracted metadata may include the scope of exposure being offered by the producer regarding the service. For example, the scope may specify exposure to all functional domains within the trusted public cloud environment such as trusted public cloud environment 120 in FIG. 1, or may specify exposure to all functional domains within a region of type device/test/perf, etc. The extracted metadata information may also include parameters of an active probe test that may be used to monitor access to the service by consumers. The system 300 may store the extracted metadata information within a local data store.

The private communication set-up system 300 configures 430 a producer-side private link service to a private communication link within the functional domain in which the system 300 is executing. The configured producer-side private link service is based on the extracted metadata of the new or updated tag. The system 300 uses the name that is in the extracted metadata to create a private DNS record associated with the name. The system 300 configures a private DNS in the producer functional domain based on the specified name in the extracted metadata. The system 300 creates a tag that is attached to the private communication link and includes metadata information about the producer-side private link service in the tag.

The private communication set-up system 300 exposes 440 the tag that is attached to the private communication link in the substrate of the public cloud infrastructure services. The system 300 displays the tag in the public cloud environment for discovery by instances of system 300 executing in the functional domains of any consumers requiring access to the services offered by the producer.

The private communication set-up system 300 that is executing in the functional domain of the producer ensures that the producer can offering valid, secure, and private access to services for use by a consumer of the service that is located in the same or different functional domain as the producer through the newly established producer-side private link service in the functional domain of the producer.

Consumer End Process

Figure 5:
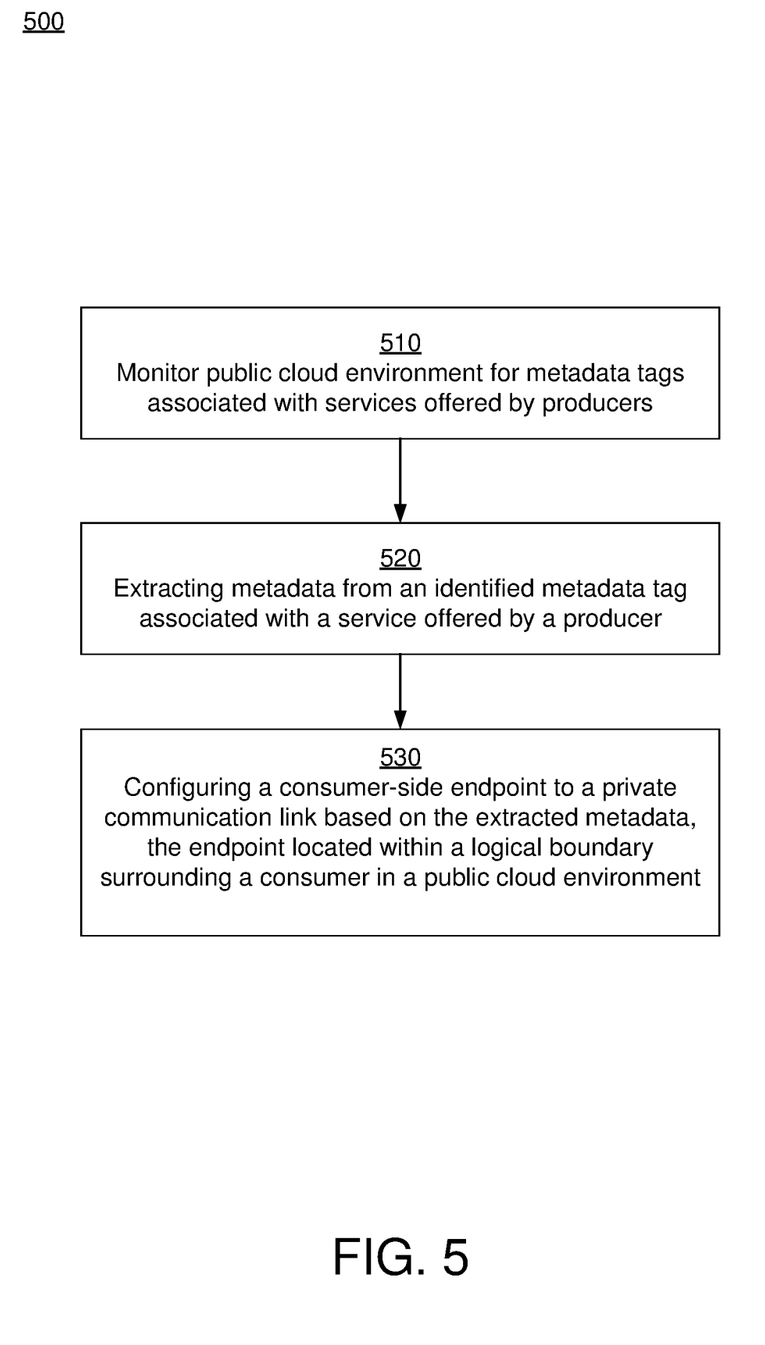
FIG. 5 is a flow chart illustrating the process for enabling private communication with respect to a consumer in a trusted public cloud environment, according to one embodiment.

FIG. 5 is a flow chart illustrating the process for setting up a communication link to access a resource by a consumer in a public cloud environment using a private communication set-up system 300 (shown in FIG. 3) according to one embodiment. The process illustrated herein is performed by an instance of the system 300 that is executing in a functional domain in which the consumer seeking access is located. Various embodiments can perform the steps of FIG. 5 in different orders than those indicated herein. Moreover, other embodiments can include different and/or additional steps than the ones described herein.

The private communication set-up system 300 monitors 510 the substrate of a public cloud infrastructure services for new or updated tagged metadata that are exposed as part of substrate metadata. The new or updated tagged metadata are exposed by an instance of the system 300 that is executing in a functional domain of a producer that is offering a service. The system 300 monitors the substrate for new or updated tags exposing metadata information about a private communication link. In some embodiments, the system 300 may monitor the substrate metadata periodically at a prespecified frequency for new or updated metadata regarding new or updated private link endpoint tags. In some embodiments, the system 300 may be configured to additionally or alternately receive notifications when a new or updated tag is exposed in the metadata.

The private communication set-up system 300 extracts 520 metadata information from identified private link tagged metadata based on the monitoring. In some embodiments, the extracted metadata information includes a name that is specified by the producer, and that is used by every consumer requiring access to the offered service. The extracted metadata may include the scope of exposure being offered by the producer regarding the service. For example, the scope may specify exposure to all functional domains within the trusted public cloud environment such as trusted public cloud environment 120 in FIG. 1, or may specify exposure to all functional domains within a region of type device/test/perf, etc. The extracted metadata information may also include parameters of an active probe test that may be used to monitor access to the service by customers. The system 300 may store the extracted metadata information within a local data store.

The private communication set-up system 300 configures 530 a consumer-side private link endpoint to the private communication link based on the extracted metadata. The system 300 uses the name that is in the extracted metadata to create a private DNS record associated with the name. The system 300 configures a private DNS in the consumer functional domain based on the specified name in the extracted metadata.

The private communication set-up system 300 that is executing in the functional domain of a consumer ensures that a consumer requiring valid, secure, and private access to services offered by a producer located in the same or different functional domain as the consumer is able to obtain the access through a newly established consumer-side private link endpoint in the functional domains of the consumer.

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs multiple salespersons, where each salesperson uses a client device to manage their sales process. Thus, a user might maintain contact data, leads data, customer follow-up data, performance data, goals and progress data, etc., all applicable to that user's personal sales process.

Computer Architecture

Figure 6:
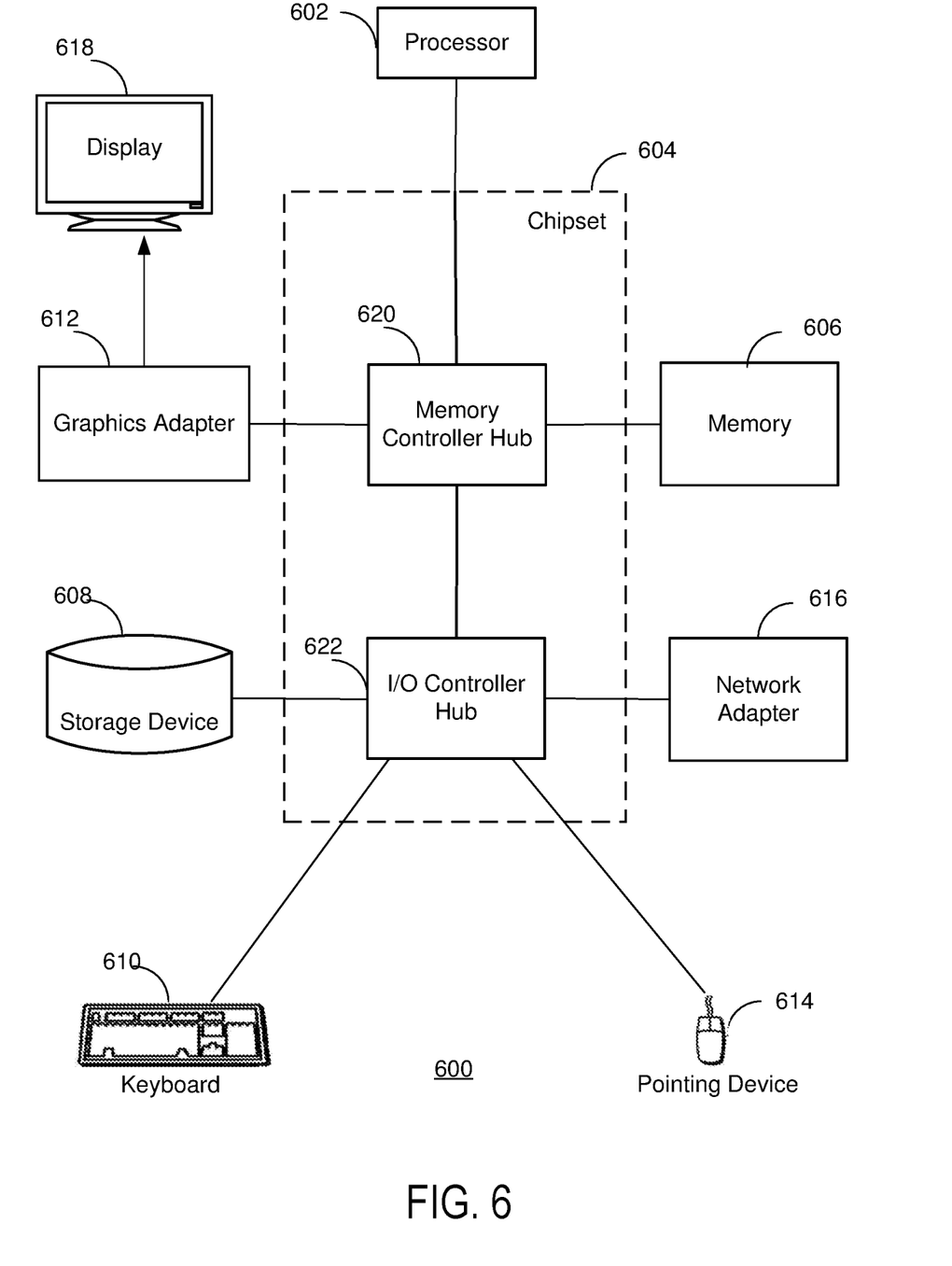
FIG. 6 is a block diagram illustrating the architecture of a typical computer system for use in the environment of FIG. 3 according to one embodiment.

FIG. 6 is a block diagram illustrating the architecture of a typical computer system 600 for use in the environments of FIG. 3 according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer system 600 can have different and/or other components than those shown in FIG. 6. In addition, the computer system 600 can lack certain illustrated components. For example, a computer system 600 acting as an online system 300 may lack a keyboard 610 and a pointing device 614. Moreover, the storage device 608 can be local and/or remote from the computer 600 (such as embodied within a storage area network (SAN)).

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the system of FIG. 3 can vary depending upon the embodiment and the processing power used by the entity. For example, a client device may be a mobile phone with limited processing power, a small display 618, and may lack a pointing device 614. The online system 300 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer-implemented method for setting up a private communication link to a service offered by a producer in a public cloud environment, the method comprising:
   monitoring the public cloud environment for one or more metadata tags associated with a corresponding one or more services offered by one or more producers;
   responsive to the monitoring, extracting metadata from an identified first metadata tag associated with a service offered by a producer;
   configuring a producer-side private link service to a private communication link for accessing the service based on the extracted metadata, wherein the producer-side private link service is located within a logical boundary surrounding the producer in the public cloud environment; and
   exposing a second metadata tag associated with the private communication link in the public cloud environment,
   thereby enabling a requesting consumer to request for and obtain access the service offered by the producer through the private communication link.

2. The computer-implemented method of claim 1, wherein the monitoring comprises monitoring for at least one of:
   a new metadata tag; and
   a metadata tag with updated field values.

3. The computer-implemented method of claim 1, wherein the monitoring is performed periodically at a pre-specified frequency.

4. The computer-implemented method of claim 1, wherein extracting metadata from the identified first metadata tag comprises extracting field values from the identified first metadata tag, the field values comprising one or more of:
   name of the service;
   scope of exposure of the service; and
   parameters of an active probe test for the service.

5. The computer-implemented method of claim 4, wherein configuring the producer-side private link service to the private communication link for accessing the service based on the extracted metadata comprises:
   creating a private domain name server (DNS) record based on the name of the service; and
   configuring a private DNS based on created record so that using the name of the service will reference one of:
      the producer; and
      a network load balancer attached to the producer.

6. The computer-implemented method of claim 1, wherein exposing a second metadata tag associated with the private communication link comprises:
   creating a tag with metadata information comprising one or more of:
      name of the service;
      scope of exposure of the service; and
      parameters of an active probe test for the service; and
   display the created tag in the public cloud environment.

7. A computer-implemented method for setting up a private communication link to access a service by a consumer in a public cloud environment, the method comprising:
   monitoring the public cloud environment for one or more metadata tags associated with a corresponding one or more private communication links to services offered by one or more producers;
   responsive to the monitoring, extracting metadata from an identified metadata tag associated with a private communication link to a service offered by a producer; and
   configuring a consumer-side private link endpoint to the private communication link based on the extracted metadata, wherein the consumer-side private link endpoint is located within a logical boundary surrounding the consumer in the public cloud environment,
   thereby enabling the consumer to request and obtain access to the service offered by the producer through the private communication link.

8. The computer-implemented method of claim 7, wherein the monitoring comprises monitoring for at least one of:
   a new metadata tag; and
   a metadata tag with updated field values.

9. The computer-implemented method of claim 7, wherein the monitoring is performed periodically at a pre-specified frequency.

10. The computer-implemented method of claim 7, wherein extracting metadata from the identified metadata tag associated with the private communication link to the service offered by the producer comprises extracting field values from the identified metadata tag, the field values comprising one or more of:
    name of the service;
    scope of exposure of the service; and
    parameters of an active probe test for the service.

11. The computer-implemented method of claim 10, wherein configuring the consumer-side private link endpoint to the private communication link based on the extracted metadata comprises:
    creating a private domain name server (DNS) record based on the name of the service; and
    configuring a private DNS based on created record so that using the name of the service will reference the consumer-side private link endpoint to the private communication link.

12. The computer-implemented method of claim 10, wherein configuring the consumer-side private link endpoint to the private communication link based on the extracted metadata comprises configuring an active probe test based on the extracted metadata.

13. The computer-implemented method of claim 12, wherein the configured active probe test obtains telemetry data comprising one or more of:
    jitter statistics;
    success and failure rate in consumer-side private link endpoint creation; and
    latency statistics.

14. A non-transitory computer readable storage medium for storing instructions that when executed by a computer processor cause the computer processor to perform steps for setting up a private communication link to a service offered by a producer in a public cloud environment, the steps comprising:
    monitoring the public cloud environment for one or more metadata tags associated with a corresponding one or more services offered by one or more producers;
    responsive to the monitoring, extracting metadata from an identified first metadata tag associated with a service offered by a producer;
    configuring a producer-side private link service to a private communication link for accessing the service based on the extracted metadata, wherein the producer-side private link service is located within a logical boundary surrounding the producer in the public cloud environment; and exposing a second metadata tag associated with the private communication link in the public cloud environment, thereby enabling a requesting consumer to request for and obtain access the service offered by the producer through the private communication link.

15. The computer readable storage medium of claim 14, wherein the monitoring comprises monitoring for at least one of:

a new metadata tag; and a metadata tag with updated field values.

16. The computer readable storage medium of claim 15, wherein extracting metadata from the identified first metadata tag comprises extracting field values from the identified first metadata tag, the field values comprising one or more of:

name of the service;

scope of exposure of the service; and parameters of an active probe test for the service.

17. The computer readable storage medium of claim 14, the steps further comprising steps for setting up a private communication link to access a service by a consumer in the public cloud environment, the steps comprising:

monitoring the public cloud environment for one or more metadata tags associated with a corresponding one or more private communication links to services offered by one or more producers;

responsive to the monitoring, extracting metadata from an identified metadata tag associated with a private communication link to a service offered by a producer; and configuring a consumer-side private link endpoint to the private communication link based on the extracted metadata, wherein the consumer-side private link endpoint is located within a logical boundary surrounding the consumer in the public cloud environment, thereby enabling the consumer to request and obtain access to the service offered by the producer through the private communication link.

18. The computer readable storage medium of claim 17, wherein extracting metadata from the identified metadata tag associated with the private communication link to the service offered by the producer comprises extracting field values from the identified metadata tag, the field values comprising one or more of:

name of the service;

scope of exposure of the service; and parameters of an active probe test for the service.

19. A computer system comprising:

a computer processor; and a non-transitory computer readable storage medium for storing instructions that when executed by a computer processor cause the computer processor to perform steps for setting up a private communication link to a service offered by a producer in a public cloud environment, the steps comprising:

monitoring the public cloud environment for one or more metadata tags associated with a corresponding one or more services offered by one or more producers;

responsive to the monitoring, extracting metadata from an identified first metadata tag associated with a service offered by a producer;

configuring a producer-side private link service to a private communication link for accessing the service based on the extracted metadata, wherein the producer-side private link service is located within a logical boundary surrounding the producer in the public cloud environment; and exposing a second metadata tag associated with the private communication link in the public cloud environment, thereby enabling a requesting consumer to request for and obtain access the service offered by the producer through the private communication link.

20. The computer system of claim 19, wherein the non-transitory computer readable storage medium for storing instructions that when executed by a computer processor cause the computer processor to perform further steps for setting up a private communication link to access a service by a consumer in the public cloud environment, the steps comprising:

monitoring the public cloud environment for one or more metadata tags associated with a corresponding one or more private communication links to services offered by one or more producers;

responsive to the monitoring, extracting metadata from an identified metadata tag associated with a private communication link to a service offered by a producer; and configuring a consumer-side private link endpoint to the private communication link based on the extracted metadata, wherein the consumer-side private link endpoint is located within a logical boundary surrounding the consumer in the public cloud environment, thereby enabling the consumer to request and obtain access to the service offered by the producer through the private communication link.

* * * * *